M. F. KENNEDY, Jr.
CAMERA.
APPLICATION FILED MAR. 3, 1919.
1,328,741.
Patented Jan. 20, 1920.
2 SHEETS—SHEET 1.
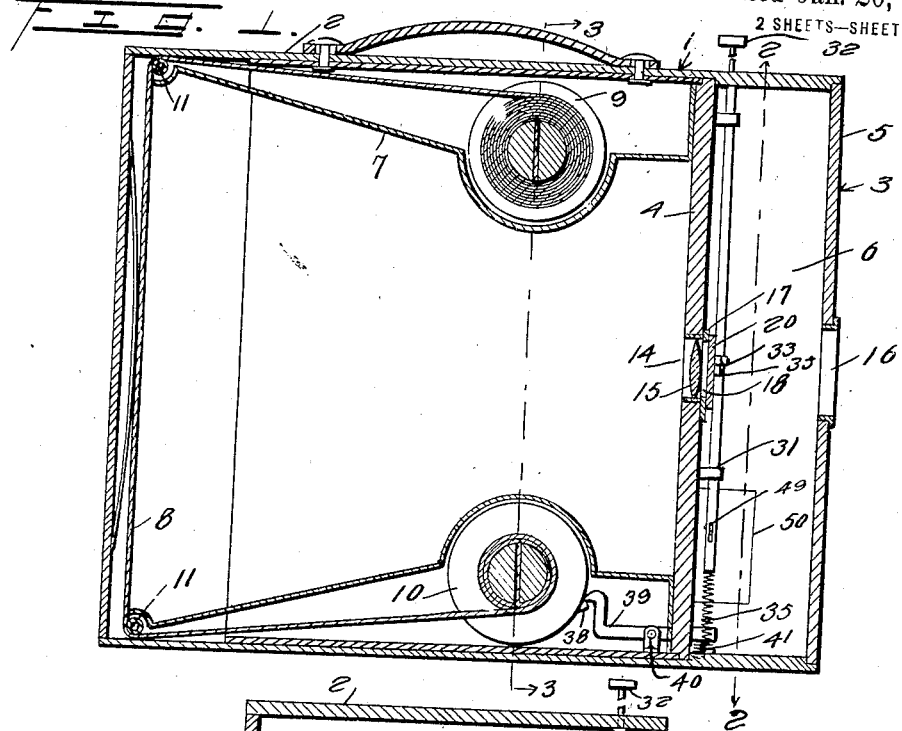
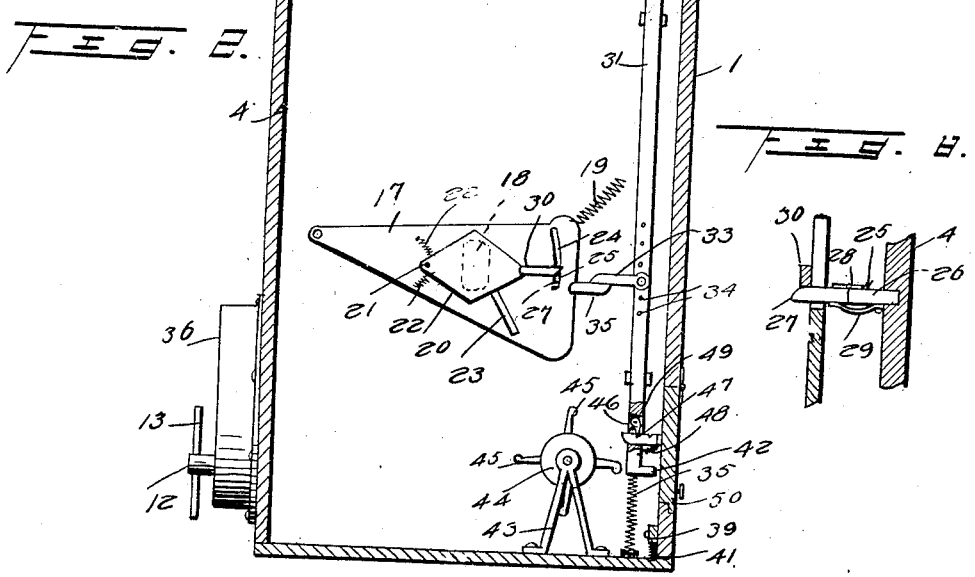
Inventor
M. F. Kennedy Jr.
By
Attorney

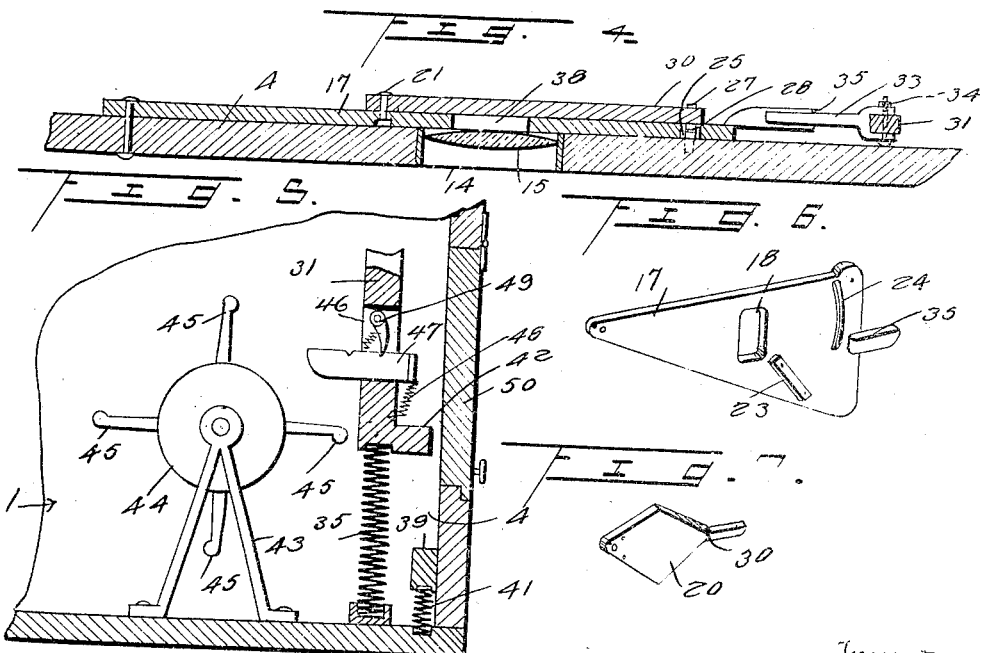

UNITED STATES PATENT OFFICE.

MICHAEL F. KENNEDY, JR., OF ATLANTA, GEORGIA.

CAMERA.

1,328,741.   Specification of Letters Patent.   Patented Jan. 20, 1920.

Application filed March 3, 1919. Serial No. 280,205.

*To all whom it may concern:*

Be it known that I, MICHAEL F. KENNEDY, Jr., a citizen of the United States, residing at Atlanta, in the county of Fulton and State of Georgia, have invented certain new and useful Improvements in Cameras; and I do hereby declare the following to be a full, clear, and exact description of the invention, such as will enable others skilled in the art to which it appertains to make and use the same.

This invention relates to improvements in cameras and has for one of its objects the provision of means for automatically winding a film after the taking of each picture, thereby automatically presenting a new or unused portion of a film in the dark room of the camera after taking each picture, thus obviating the manual winding of the film after taking each picture, and also keeping the camera in condition to take a picture at all times.

Another object of this invention is the provision of means for automatically actuating the camera to take pictures at predetermined times and which will permit manual actuation of the camera when desired.

A further object of this invention is the provision of a novel form of shutter which can be manually or automatically operated and which when idle will insure a complete closure to the dark room thereby obviating the danger of light entering said dark room and injuring the film while the camera is idle.

A still further object of this invention is the provision of a camera of the above stated character, which shall be simple, durable and efficient, and which may be manufactured and sold at a comparatively low cost.

With these and other objects in view as will become more apparent as the description proceeds, the invention consists in certain novel features of construction, combination, and arrangement of parts, as will be hereinafter more fully described and claimed.

For a complete understanding of my invention, reference is to be had to the following description and accompanying drawings, in which:—

Figure 1 is a vertical sectional view of a camera constructed in accordance with my invention, Fig. 2 is a transverse sectional view taken on the line 2—2 of Fig. 1, Fig. 3 is a similar view taken on the line 3—3 of Fig. 1 illustrating the film rollers, Fig. 4 is a fragmentary horizontal sectional view illustrating the shutter and lens to the camera, Fig. 5 is a fragmentary sectional view illustrating the means for automatically actuating the camera at predetermined times, Fig. 6 is a perspective view of a main shutter, Fig. 7 is a similar view of an auxiliary shutter, Fig. 8 is a detail sectional view of a trip pin.

Referring in detail to the drawings, the numeral 1 indicates as an entirety a camera including a casing or shell 2 having one end thereof fully open and adapted to be closed by an end member 3 consisting of inner and outer relatively spaced walls 4 and 5 respectively. The walls 4 and 5 are connected together by top, bottom and side walls to form a compartment 6. The inner wall 4 carries the usual dark room 7 that extends into the casing or shell 2 of the camera and has its inner end fully open and over which passes the film 8.

The film 8 is wound upon the roller 9 and is adapted to be fed from the same on to a take up roller 10. The rollers 9 and 10 are mounted within the casing or shell 2 in the usual manner and the inner edges of the dark room 7 are equipped with rollers 11 to permit the film 8 to pass freely in rear of the dark room from the roller 9 to the take up roller 10. The take up roller 10 is adapted to have connected therewith the usual manual actuating rod 12 carried by the casing or shell 2 and disposed exteriorly thereof and has mounted thereon a handle 13 whereby the take up roller can be rotated for winding the film from the roller 9 on to the same as the pictures are taken. The inner wall 4 is provided with an opening 14 in which is mounted the lens 15. The outer wall 5 is provided with an opening 16 in registration with the opening 14 and the lens 15 so that the light from the object to be taken can pass through the lens and affect the film 8 overlying the open end of the dark room 7.

To control the taking of the picture at the opening 14 and lens 15, a main shutter 17 of substantially triangular shape has its apex pivoted to the outer face of the inner wall 4 or is located within the compartment 6 and is provided with an opening 18 normally held out of registration with the opening 14 and lens 15 by means of a spring 19. The main shutter 17 operates or rides in close relation to the outer face of the inner wall 4 so that light cannot extend through the opening 14 and the lens 15 from around the edges of the shutter. The shutter 20 is pivoted to the main shutter 17 as illustrated at 21 and is normally held in a position to overlie the opening 18 by means of springs 22 so as to reinforce the closure to the opening 14 and lens 15 of the camera. The shutter 20 is limited in its downward movement by means of a projection or stop 23 formed upon the main shutter 17. The springs 22 normally hold the shutter in engagement with the stop 23 so that the opening 18 of the main shutter is closed. The main shutter 17 is provided with an arcuate slot 24 to receive a pin 25 carried by the wall of the camera 1 and consists of sections 26 and 27 that are secured together by a hinge 28 which permits the section 27 to move freely in one direction but will prevent said section from moving in an opposite direction. A leaf spring 29 is secured to the section 26 and rests against the section 27 so as to hold the sections in parallel relation to each other and which will permit the section 27 to move freely in one direction while engaged by extension 30 carried by the free end of the auxiliary shutter 20. The extension 30 has a beveled end adapted to coöperate with the beveled end of the section 27 of the pin 25 so that the shutter 20 will remain stationary during the partial movement of the main shutter 17 and at a later moment or time the extension 30 will ride past the pin 25 closing the opening 18 of the main shutter 17.

An operating lever 31 is slidably mounted within the compartment 6 and extends through the top wall thereof and is provided with a handle or finger key 32. An extension or arm 33 is secured to the actuating rod 31 and can be adjusted thereon by the plurality of openings 34 formed within said rod. The extension or arm 33 is provided with a beveled end and is adapted to engage the extension or arm 35 formed upon the free end of the main shutter 17. The operating rod 31 is normally supported in upward position by means of spring 35 located between the lower end of the same and the bottom wall of the compartment 6 so that the operating rod is ever set or ready for operation at all times. The operator presses downwardly upon the operating rod 31 and during its downward movement, the main shutter 17 moves downwardly bringing the opening 18 into registration with the opening 14 and lens 15 while the auxiliary shutter 20 remains stationary uncovering the opening 18 owing to the extension 30 engaging the pin 25 and during further movement of the main shutter 17 downwardly under the influence of the operating rod 31 the extension 30 rides past the pin 25 and the spring 22 brings the auxiliary shutter 20 into engagement with the stop 23 closing the opening 18 in the main shutter 17 thus causing a rapid opening and closing of the opening 14 and the lens 15. When the main shutter 17 has moved downwardly its fullest extent, the operating rod 31 is released and the spring 35 removes the same to its initial position and the main shutter 17 along with the auxiliary shutter 20 will return to their initial position under the influence of the spring 19.

A casing 36 is secured to the exterior of the casing or shell 2 about the winding shaft or rod 12 and has located therein a suitable clock mechanism which is geared to a gear 37 secured to the winding shaft 12 whereby upon the clock mechanism being freed or set into operation, the take up roller 10 will be rotated winding thereon the film 8 from the roller 9. The take up roller 10 has formed thereon a projection 38 adapted to be engaged by a lever 39. The lever 39 is pivotally mounted within the casing or shell 2 of the camera 1, as illustrated at 40 and has one end disposed through the inner wall 4. The coil spring 41 is interposed between the bottom wall of the compartment 6 and the outer end of the lever 39 for forcing its other or inner end into an engagement with the projection 38 upon the take up roller 10 to hold the same against rotation under the influence of the clock mechanism. A right angle projection 42 is formed upon the lower end of the operating rod 31 and is adapted to engage the outer end of the lever 39 for disengaging the inner end thereof from the tooth or projection 38 on the take up roller 10 after the operating roller 31 has reached its lowermost position or is about to reach such a position, thereby freeing the take up roller 10 permitting the same to be driven by the clock mechanism winding thereon the film which has just been subjected to light rays through the opening 14 and the lens 15 of the camera, presenting in its place an unused portion of the film from the roller 9. The rod 31 rocks the lever 39 upon the pivot a short time before the operating rod starts on its upward motion under the influence of the spring 35, which time is sufficient to disengage the inner end of said lever from the tooth or projection 38 permitting the take up roller 10 to be driven by the clock mechanism and which roller continues to rotate until the projection or tooth 38 is again engaged by the inner end of the lever 39 thus stopping the movement of the film as well as that of the clock mechanism. After the lever 39 has been tripped by the operating member 31 it returns to its normal position under the influence of the spring 41 so as to engage the tooth or projection 38 when the same returns to its initial position after once being freed.

A bracket 43 is located within the compartment 6 and is adapted to support a time controlled mechanism 44 of any desired character provided with radially extending arms 45 which are adapted to rotate under the influence of the time controlled mechanism 44 and which rotates at a very slow rate of speed, for instance, fifteen or twenty minutes can elapse in the arms making one-quarter of a turn. The lower end of the operating rod 31 is provided with a slot 46 in which is slidably mounted a dog 47 adapted to be engaged by the arms 45 when they are driven by the time controlled mechanism 44 so as to move the actuating rod 31 downwardly to operate the shutters and film operating mechanism to take the picture. The dog 47 is urged in the direction of the arm 45 by a spring 48 and is held in two positions by the dog 49. This dog 49 is carried by the operating rod 31 and is adapted to be positioned in either one of the notches in the dog 47 for holding the same in the path of the arms 45 or out of the path of said arms when it is desired to operate the camera manually. When the dog 47 is positioned in such a manner as to be located within the path of the arms 45, said arms will engage the dog at predetermined times to operate the rod 31 which in turn operates the camera or the shutters and dog mechanism thereof to take the picture automatically. The wall of the camera is provided with a door 50 so that the position of the dog 47 can be adjusted whenever desired. The rod 31 can return to its initial position before the next arm 45 has time to engage the dog 47.

From the foregoing description taken in connection with the accompanying drawings, it will be noted that means is provided for operating or moving the film automatically after taking a picture and also whereby the camera can be automatically operated at predetermined times, thus providing a device especially adaptable for military purposes whereby the camera may be positioned at a given point and at different intervals or at predetermined times will take pictures of objects or positions in front of the camera.

While I have shown and described the preferred embodiment of my invention, it will be understood that minor changes in construction, combination and arrangement of parts may be made without departing from the spirit and scope of the invention as claimed.

Having thus described my invention, what I claim as my invention is:

1. A camera including a dark room having film rollers with a film and a lens opening, a main shutter having an opening, an auxiliary shutter carried by the main shutter and normally overlying the opening, an operating rod adapted in its initial movement to operate the main shutter to bring the opening thereof in registration with the lens opening, means for holding the auxiliary shutter against movement during the initial movement of the main shutter and adapted to permit said auxiliary shutter to move with the main shutter after the given movement of the main shutter to close said opening, and means controlled by said rod for winding a portion of the film from one roller to another after each operation of the shutters.

2. A camera including a dark room having film rollers with a film and a lens opening, a main shutter for controlling said lens opening and having an opening therein, an auxiliary shutter carried by the main shutter springs connected to the main shutter and the auxiliary shutter for holding the auxiliary shutter normally over the opening of the main shutter, an operating rod adapted to move the main shutter downwardly, means returning the main shutter to its initial position, means holding the auxiliary shutter against downward movement on the initial movement of the main shutter downwardly and adapted to free said auxiliary shutter after a predetermined movement of the main shutter to close the opening thereof and permit said auxiliary shutter to return with the main shutter when said main shutter moves upwardly and means controlled by said rod for winding a portion of the film from one roller to another after each operation of the shutters.

3. A camera including a dark room having film rollers with a film and a lens opening, a shutter for controlling the lens opening, an operating rod for actuating said shutter having a slot in its lower end, a dog adjustably mounted within said slot, a time controlled mechanism adapted to engage the dog when said dog is in one position for automatically operating the rod at predetermined times, said dog adapted to be moved to another position to permit the manual operation of the rod, and means controlled by said rod for winding a portion of the film from one roller to another after each operation of the shutter.

4. A camera including a dark room having film rollers with a film and a lens opening, a shutter for controlling said lens opening, an operating rod for actuating said shutter, means whereby said rod may be actuated automatically at predetermined times, means for permitting said rod to be actuated manually, a clock mechanism connected to one of said rollers, a projection formed on said roller, a lever pivotally mounted and in engagement with said projection to hold the clock mechanism and roller against movement, and a right angular extension formed upon the rod and adapted to engage the lever to disengage the same from the projection to permit the clock mechanism to rotate the roller for winding a portion of the film thereon.

In testimony whereof I affix my signature in presence of two witnesses.

MICHAEL F. KENNEDY, JR.

Witnesses:
G. M. WATKINS,
L. M. SCHEERER.